United States Patent [19]

Laughinghouse et al.

[11] 4,238,438
[45] Dec. 9, 1980

[54] HARDBOARD WITH SMOOTH, DENSE SURFACE AND METHOD

[75] Inventors: Gerald F. Laughinghouse; Donald B. Gibson, both of Rock Hill, S.C.

[73] Assignee: Champion International Corporation, Stamford, Conn.

[21] Appl. No.: 8,290

[22] Filed: Feb. 1, 1979

[51] Int. Cl.³ .............................................. D21J 1/08
[52] U.S. Cl. .................................. 264/119; 156/62.2; 162/136; 162/223; 162/225; 264/128
[58] Field of Search ............... 264/119, 109, 130, 128; 162/225, 136, 223; 156/62.2

[56] References Cited

U.S. PATENT DOCUMENTS

| | | | |
|---|---|---|---|
| 2,872,337 | 2/1959 | Heritage et al. | 428/506 |
| 3,151,016 | 9/1964 | Kutik | 162/136 |
| 4,053,339 | 10/1977 | Story et al. | 156/62.2 |

FOREIGN PATENT DOCUMENTS 1156233  10/1963  Fed. Rep. of Germany ........... 264/109

Primary Examiner—Stanley S. Silverman
Attorney, Agent, or Firm—Evelyn M. Sommer

[57] ABSTRACT

Disclosed is a hardboard with a smooth, highly-consolidated, dense surface and a method for making it. The method of this invention greatly reduces the need for surface sanding after molding because release from the molding caul is improved and results in a product having a surface more free of defects. According to a preferred embodiment, a dry mat of wood particles is sprayed with from 8 to 30 grams per square foot of a surface coating of a consolidating agent comprising from 50 to 95% water, from 4 to 25% ethylene glycol and from 1 to 25% polyvinyl acetate, prior to pressing at elevated temperature. These percentages are based on the weight of the consolidating agent. The preferred products will have at least one highly-consolidated, smooth surface layer which comprises from 0.5 to 4 grams of polyhydric alcohol and from 0.5 to 4 grams of polyvinyl acetate per square foot of surface.

8 Claims, No Drawings

HARDBOARD WITH SMOOTH, DENSE SURFACE AND METHOD

BACKGROUND OF THE INVENTION

The present invention relates to hardboard panels, and more specifically to hardboard panels having improved smooth, dense surfaces and methods for making these.

Many different methods have been developed for making hardboard products by reducing wood or other lignocellulose products to fine particles, forming these particles into a unitary mat, and consolidating the mat into a solid board by applying heat and pressure. Two known methods for making hardboard are the wet process and the dry process.

In the wet process a pulp mat is prepared from aqueous slurry of wood fibers and formed into a thick sheet in a manner similar to the conventional paper manufacturing process, and the mat is pressed into a fiber board panel.

The term "dry process" or "dry formed" usually indicates that the fibers are conveyed in a gaseous stream rather than a liquid stream to a felter and formed into a mat which is consolidated into hardboard by the application of heat and pressure. If desired, the particles or chip board materials may be mechanically conveyed in the dry process for felting or forming. The main distinguishing feature of the dry process is the absence of a liquid transport medium. Even though the process is termed "dry", the fibers can have a moisture content of up to 100% of the weight of the dry fibers. Moisture in the range of 5 to 8% is generally required for good consolidation.

It has been found that in forming thick panels by the dry process, particularly those above ¼ inch in thickness, it is difficult to secure hard, smooth surfaces. Soft surfaces which have low abrasion resistance, and are excessively adsorptive of paint or adhesive material, are often obtained. It is believed that the migration of moisture away from the surface before the resin is heated sufficiently to flow, inhibits proper consolidation of the fibers at the surface of the mat and results in soft surfaces. It has been found that panels are improved by the addition of moisture to mat surfaces prior to their entering the press. To prevent the rapid migration of the moisture away from the surface of the panel before the resin flows to bond the fibers, the use of surface added moisturizers for hardboard manufacture was suggested in now abandoned U.S. Ser. No. 289,370, filed Aug. 31, 1972 as identified in U.S. Pat. No. 4,053,339. In that application, a mixture of water and ethylene glycol was sprayed onto the mat surface prior to pressing and resulted in a superior surface. However, this process had the undesirable side effect of an increased tendency of the panel to stick to the platens or configured molding caul. It has been the experience with this type of process that a subsequent sanding procedure may be required after molding. This causes increased costs for those panels which can be improved by sanding, but is wholly unacceptable for panels that are to be finished without sanding.

In U.S. Pat. No. 4,053,339, Story and Gibson proposed solving this problem by applying a dry paper overlay, such as newsprint, on the hardboard panel prior to final curing. It is disclosed that this procedure resulted in a good bond between the paper overlay and the panel by the use of a mixture of phenolic resin and the preferred plasticizer, ethylene glycol. While overlay panels made according to that procedure did have superior finishing properties, good paint holdout, high resistance to scuffing, and could be easily and cleanly cut, they had the disadvantage that the extra operation of applying the dry paper overlay introduces an additional degree of complexity into the process.

While not directed to the immediate problem of providing a smooth, dense surface layer in a hardboard panel, U.S. Pat. No. 2,629,674 to Ericks discloses the treatment by impregnating preformed mats with a mixture of a glycol and a thermosetting resin to improve dimensional stability of the board. The patentee does not disclose surface treatment of a preformed mat prior to pressing with caul plates to provide improved surface characteristics of the final board, but teaches adding his compositions to the entire stock prior to formation to obtain improved dimensional stability.

Other workers, such as Heritage and Roberts in U.S. Pat. No. 2,872,337, have suggested adding surface treating agents to impart a glossy, hard surface to pressed board products. The patentees specifically suggested thermosetting resins such as phenol-formaldehyde resins. Alternatively, they suggest thermoplastic treating agents such as vinyl resins which can be employed in solutions, emulsions or suspensions using water, alcohol or other liquid carrying medium. While this reference offers a concept of broad scope, it does not provide much specific guidance for employing specific operable treatments based on the thermoplastic resins which provide improved surfaces and good release from the mold.

There remains a need to develop a simple and effective method for preparing hardboard panels with smooth, dense surfaces, and there obviously also remains a need for a more economically produced panel having these desired surface characteristics.

SUMMARY OF THE INVENTION

It is an object of the present invention to provide a hardboard panel having a smooth, dense surface.

It is another object of the present invention to provide a method for making a hardboard panel with a smooth, dense surface.

It is yet another object of the present invention to provide an improved method for making a hardboard panel with a smooth, dense surface which eliminates the need for sanding subsequent to release from the mold.

It is a more specific object of the present invention to provide an improved method for making a hardboard panel by the dry process wherein a surface coating of the fiber mat prior to pressing will facilitate easy release from the molding caul.

It is another specific object of the present invention to provide an improved method for preparing a hardboard panel having a smooth, dense surface by the dry process by spraying a liquid material onto the surface of a fiber mat prior to pressing to achieve easy release from the mold and good surface consolidation of the fibers within the hardboard.

These and other objects are accomplished according to the present invention which provides an improved hardboard with a smooth, highly-consolidated, dense surface and a method for making it. The improved hardboard of the present invention is comprised of fibers adhered together by a thermally set glue system distributed substantially uniformly throughout said fibers, wherein the improvement comprises: a smooth, dense surface comprised of a highly consolidated surface layer of fibers which comprises from 0.3 to 7.5 grams per square foot of hydroxy-radical-containing compound having a boiling point between about 212° F. and 600° F. which is selected from the group consisting of alcohols and their esters and from 0.1 to 7.5 grams per square foot of polyvinyl acetate. The process comprises: (a) mixing fibers with a thermosetting glue system; (b) forming a mat of said fibers; (c) applying to the surface fibers of said mat from 8 to 30 grams per square foot of a coating of a surface consolidating agent comprising from 50 to 95% water, from 4 to 25% of a hydroxy-radical-containing compound having a boiling point between about 212° F. and 600° F. which is selected from the group of alcohols and their esters, and from 1 to 25% polyvinyl acetate, wherein the percentages of coating ingredients are based on the weight of the coating; and (d) pressing the mat for a time and at a temperature and pressure effective to consolidate the fibers and permanently bind them by virtue of the glue system.

DETAILED DESCRIPTION OF THE INVENTION

The basic process for preparing hardboard starts with the preparation of fibers from wood or other lignocellulose product. The overall process is well known in the art and is discussed for example in U.S. Pat. No. 3,098,785. In the preferred embodiment where wood chips provide a starting material, the chips are steamed, converted to fibers in a refiner, felted to form a mat and hot pressed to form the board.

Typically, wood chips are fed to a cooker, such as a Grenco continuous type or other similar cooker and steamed for from about 1 to 6 minutes, such as about 4 minutes, at pressures ranging from about 25 psi to about 200 psi, such as about 100 psi. The temperatures employed typically range from about 240° F. to about 380° F., such as about 340° F.

The steamed chips are introduced into a refining zone wherein they are reduced to fibers of the desired sizes. The refiner may be of any satisfactory conventional type, such as a Bauer refiner having a chip inlet and fiber outlet with grinding discs. At times it may be desirable to add the glue system in the refining zone. The fibers are then passed to a drier and then at times to a classification zone. In many operations the fibers are not classified but are introduced directly into the felting zone. In some other operations the fibers are classified, separating the fine particles from the coarse particles. If desired, the fine particles can constitute the face plies while the coarse particles constitute the interior.

The moisture contents of the fibers will be those conventionally employed. The moisture content can be as high as 100% of the weight of the dry fibers, but is generally below 30%. Moisture contents in the range of 5 to 8% are preferred.

A satisfactory thermosetting glue system is mixed with the particles by conventional mixing means. The glue system may comprise, for example, a phenol formaldehyde resin, a urea formaldehyde resin or a urea melamine formaldehyde resin. The preferred resin in accordance with the present invention consists of a phenol formaldehyde resin. The amount of glue utilized may vary appreciably but is preferably in the range from about 0.5% to 6.0% by weight based on the dry fiber.

The felted mat is then conventionally passed to a hot press zone where it is pressed between two molding platens or cauls under sufficient heat and pressure for a sufficient time to densify the mat and set the glue system to form a dimensionally stable hardboard. It is at this stage in the process that the prior art experienced the noted problems of: first, poor surface consolidation and densification of the surface; and second, the problem of sticking to the molding caul or additional processing steps where corrective measures were taken. Now, however, by virtue of the present invention there is provided an improved hardboard having a smooth, dense surface and a method of making it.

By the term "smooth", it is meant a substantially continuous surface, free from voids due to poor consolidation of the surface, and also free from blemishes caused by the surface being ripped or torn due to non-release from the molding surface. The term "smooth" is not intended to be limited to the narrow meaning of a substantially planar surface devoid of surface irregularities. Indeed, the term "smooth" is meant to include highly-textured, wood-grain simulating surfaces which are continuous and free from voids caused by poor consolidation and blemishes caused by poor release from the mold surface.

The process of this invention does not require major changes in the conventional process schemes for preparing hardboard, but can in fact easily be adapted to them. In accordance with the invention, an improved surface consolidating agent is applied to at least one surface of the fiber mat prior to pressing under conventional conditions. These conditions will provide sufficiently elevated temperatures and pressures for sufficiently long times to be effective to consolidate the fibers and permanently bind them by virtue of the glue system. Also, by virtue of the present invention, the surface will be highly densified and rendered substantially free from pores or voids.

In one typical operation the mat is pressed, for example, for 10 seconds at 400 psi; then for 4 minutes at 150 psi at a temperature in the range of from about 400° F. to 500° F., such as about 450° F.

The pressure may range from about atmospheric pressure to about 100 psi, preferably from about 100 psi to 400 psi. Generally, there is an initial pressure as, for example, 400 psi for a period of from about 8 seconds to 30 seconds, and then a holding pressure of 50 psi to about 200 psi, such as about 150 psi for a period of 1 minute to 10 minutes, such as about 4 minutes. The temperature ranges from about 200° F. to about 600° F., preferably about 300° F. to 475° F., such as about 450° F.

In accordance with the present invention an improved consolidating agent is applied to the surface of the mat prior to pressing. The agent comprises from 50 to 95% water, from 4 to 25% of a hydroxy-radical-containing compound boiling between about 212° F. and 600° F. selected from the group consisting of alcohols and their esters, and from 1 to 25% of polyvinyl acetate, these percentages being based on the weight of the consolidating agent. Preferably, the consolidating agent will comprise from 62 to 95% water, from 2 to 19% of the hydroxy-radical-containing compound, and from 2 to 19% polyvinyl acetate. An effective amount of a thickener or a flow control agent, such as polyacrylamide, can also be employed.

The total weight of the consolidating agent will obviously depend upon a number of factors including the thickness and density of the hardboard being produced. However, amounts from 8 to 30 grams per square foot of area are suitable for most purposes. Preferably, the consolidating agent will be sprayed onto the fiber mat at a rate of 10 to 25 grams per square foot for boards up to about 0.75 inch in thickness having densities within the range of from 40 to 60 pounds per cubic foot. The preferred method of application is by airless spray.

The hydroxy-radical-containing compound will have a boiling point between about 212° F. and 600° F. and preferably between the boiling point of water and the platen temperature, say, about 450° F. Suitable materials include alcohols and their esters. Specific desirable agents are polyhydric alcohols such as ethylene glycol, 1,2-propanediol, 1,3-butanediol, 1,3-propanediol and glycerine. The dihydric alcohols are very desirable.

Polyvinyl acetate is a transparent organic polymeric material. It is thermoplastic in nature, in that it softens and flows upon heating. It is insoluble in water or mineral oils but soluble in some organic solvents when cured. In the present application of this material as an important component of the consolidating agent, the polyvinyl acetate is colloidally dispersed in an aqueous medium in what is commonly referred to as a latex emulsion. One preferred source of polyvinyl acetate latex is available from the Glidden-Durkee division of the SCM Corporation under the trade mark "Fibertite". Other commercially available alternatives are Valspar M23812 and Napco 7-2314. The Fibertite product in particular is made specifically for use in manufacturing hardboard, and is suggested by its manufacturer to: reduce the need for cleaning press and caul plates, improve surface smoothness and hardness, increase press speeds, give good texture definition, and result in tightly tied surface fibers. However, there is absolutely no suggestion that this material or other polyvinyl acetate compositions broadly can be improved in effectiveness by employing them with water and the alcohol or ester as set forth herein.

The present invention will be further understood in light of the following examples which are meant to further illustrate and explain the present invention and are not to be taken as limiting in any regard. Unless otherwise indicated, all parts and percentages are by weight.

EXAMPLE I

This example describes the preparation of a hardboard according to the present invention. The wood chips for forming the board are fed into a Grenco continuous cooker wherein they are steamed for about 4 minutes at a pressure of about 100 psi and a temperature of about 340° F. The steamed chips are then introduced into a Bauer refiner wherein they are reduced to fibers having sizes such that 75% passes through #8 mesh, but is retained on top of #100 mesh*. A phenol-formaldehyde thermosetting glue is uniformly dispersed with the fibers in an amount of 5.7% based on the dry weight of the fibers. The fibers are then dried to a moisture content of 5.0% and laid into a mat 5 inches in thickness, which is then prepressed under sufficient pressure to reduce mat height to 2 inches. The top surface of the mat is sprayed, by an airless spray system, with 21 grams per square foot of a surface consolidating agent comprising 86% water, 6.5% ethylene glycol and 7.5% polyvinyl acetate added as Glidden "Fibertite". The mat is then pressed for 10 seconds at a press temperature of 475° F. and a pressure of 400 psi, and then for 4 minutes at a press temperature of 475° F. and a pressure of 150 psi.

*U.S. Standard Testing Sieve size; ASTM E11 specification.

EXAMPLE II

This example compares the panel made in Example I above (A), with two other panels made by the same procedure, but varying only the composition of the consolidating agent. In one case (B), the component omitted was polyvinyl acetate; and in the other (C), ethylene glycol and polyvinyl acetate were omitted. These panels are compared for the properties of abrasion resistance and paint hold-out. The abrasion test results are shown in the following table:

| Panel | Tabor Abrasion Test | |
|---|---|---|
| | Thickness loss inches | Weight loss Grams |
| A | .0016 | .1196 |
| B | .0025 | .1338 |
| C | .0059 | .3416 |

The paint hold-out tests showed that paint hold-out was improved by 20%, on panels A and B, as compared to panel C.

The above description is for the purpose of explaining the invention to people of ordinary skill in the art and is not intended to describe all those obvious modifications and variations thereof which will become apparent upon reading. It is intended, however, that all such modifications and variations be included within the invention, the scope of which is defined by the following claims.

What is claimed is:

1. A dry formed method for making hardboard with a smooth, dense surface which comprises:
   (a) mixing fibers with a thermosetting glue system;
   (b) forming a mat of said fibers having a moisture content less than 30%;
   (c) applying to the surface fibers of said mat from 8 to 30 grams per square foot of a coating of a surface consolidating agent comprising from 62 to 95% water, from 4 to 25% of a hydroxy-radical-containing compound having a boiling point of from 212° F. to 600° F. selected from the group consisting of alcohols and their esters, and from 1 to 25% polyvinyl acetate, wherein the percentages of ingredients are based on the weight of the surface consolidating agent; and
   (d) pressing said mat for a time and at a temperature and pressure effective to consolidate the fibers and permanently bind them by virtue of the glue system.

2. A method according to claim 1 wherein the hydroxy-radical-containing compound is a polyhydric alcohol.

3. A method according to claim 1 wherein the mat is pressed at a temperature in the range of about 200° F. to about 600° F., at a pressure of about atmospheric to about 1000 psi and for a time period of up to about 10 minutes.

4. A method according to claim 1 wherein the glue system is mixed in an amount of from 0.5 to 10% based on the dry weight of the fibers.

5. A method according to claim 1 wherein the glue system comprises a member selected from the class consisting of phenol formaldehyde resin, urea formaldehyde resin, melamine formaldehyde resin and combinations thereof.

6. A method according to claim 1 wherein the glue system comprises a phenol formaldehyde resin in an amount of from about 2 to 6% based on the dry weight of the fibers; the hydroxyl group-containing compound comprises ethylene glycol; and the mat is pressed at a temperature in the range of about 200° F. to about 600° F., at a pressure of about atmospheric to about 1000 psi for a time period of up to about 10 minutes.

7. A method according to claim 6 wherein the surface consolidating agent is applied to the mat in an amount of from 8 to 30 grams per square foot of surface and comprises from 50 to 95% water, from 4-25% polyhydric alcohol, and from 1 to 25% polyvinyl acetate.

8. A method according to claim 7 wherein the mat is pressed with a caul having a molding surface which is configured to apply a wood grain configuration to the surface of the finished panel.

* * * * *

UNITED STATES PATENT AND TRADEMARK OFFICE
CERTIFICATE OF CORRECTION

PATENT NO. : 4,238,438
DATED : December 9, 1980
INVENTOR(S) : GERALD F. LAUGHINGHOUSE & DONALD B. GIBSON It is certified that error appears in the above-identified patent and that said Letters Patent are hereby corrected as shown below:

In Column 4, line 44, delete "100" and insert in lieu thereof -- 1000 --.

Signed and Sealed this

Fourteenth Day of July 1981

[SEAL]

Attest:

GERALD J. MOSSINGHOFF

*Attesting Officer*  *Commissioner of Patents and Trademarks*